Dec. 27, 1960     H. W. CURRIE     2,966,018
AUTOMATIC STACKER AND PALLETIZER
Filed June 5, 1957     9 Sheets-Sheet 1

INVENTOR
HUGH W. CURRIE
BY
ATTORNEYS

Dec. 27, 1960  H. W. CURRIE  2,966,018
AUTOMATIC STACKER AND PALLETIZER
Filed June 5, 1957  9 Sheets-Sheet 3

INVENTOR
HUGH W. CURRIE
BY
*Brown, Jackson, Boettcher & Dienner*
ATTORNEYS

Dec. 27, 1960  H. W. CURRIE  2,966,018
AUTOMATIC STACKER AND PALLETIZER
Filed June 5, 1957  9 Sheets-Sheet 4

INVENTOR
HUGH W. CURRIE
BY
Brown, Jackson, Boettcher & Dienner,
ATTORNEYS

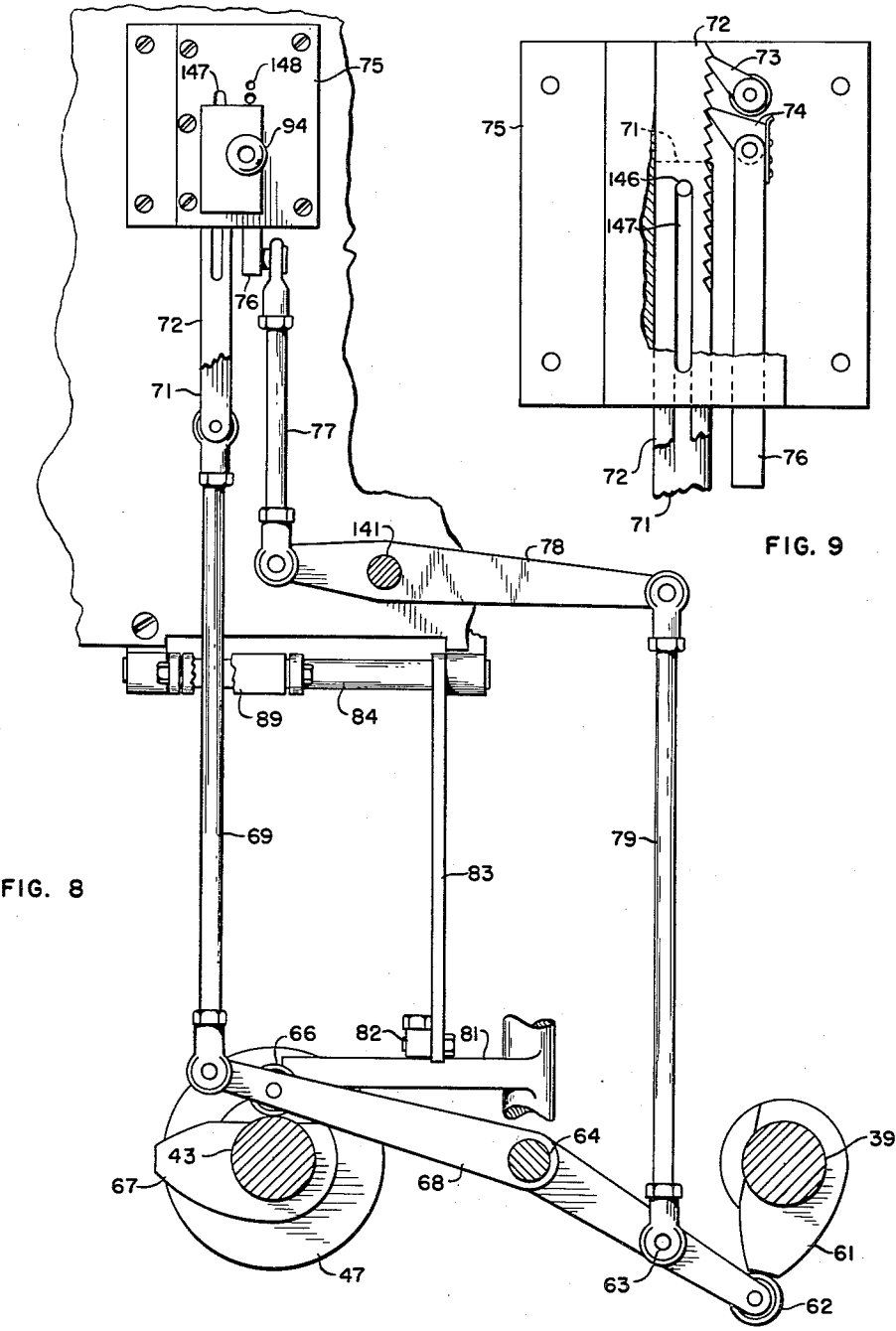

Dec. 27, 1960 H. W. CURRIE 2,966,018
AUTOMATIC STACKER AND PALLETIZER
Filed June 5, 1957 9 Sheets-Sheet 6
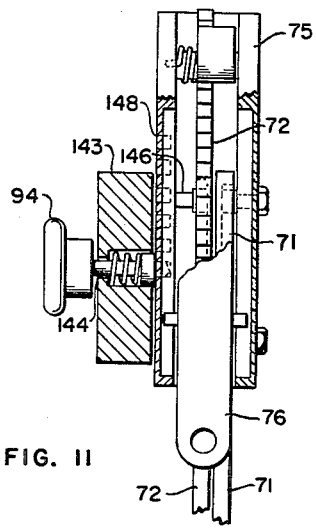
FIG. 11
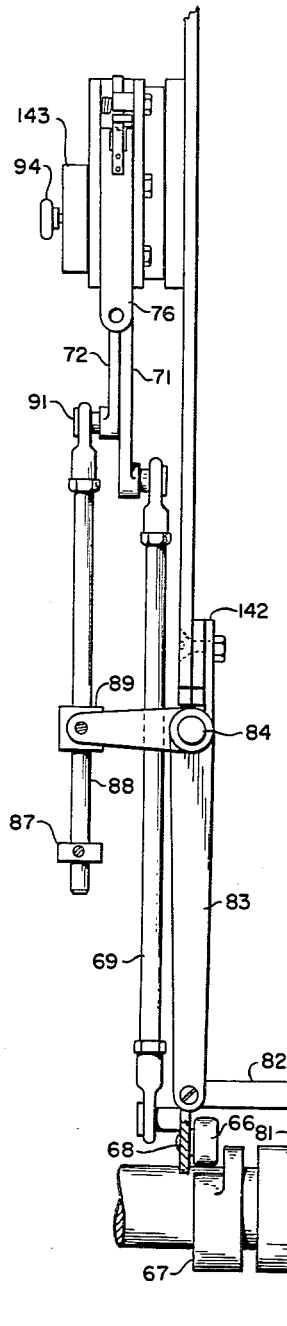
FIG. 10
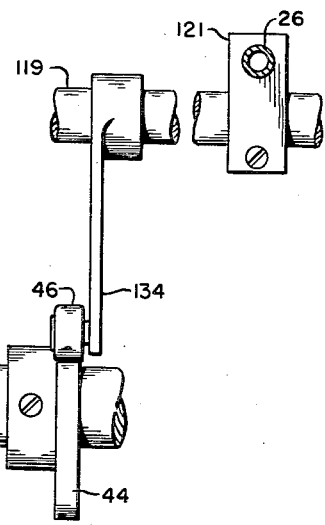
INVENTOR
HUGH W. CURRIE
BY
Brown, Jackson, Boettcher & Dienner
ATTORNEYS Dec. 27, 1960

H. W. CURRIE 2,966,018

AUTOMATIC STACKER AND PALLETIZER

Filed June 5, 1957

INVENTOR
HUGH W. CURRIE

BY
Brown, Jackson, Boettcher & Dienner

ATTORNEYS

Dec. 27, 1960 H. W. CURRIE 2,966,018
AUTOMATIC STACKER AND PALLETIZER
Filed June 5, 1957 9 Sheets-Sheet 8
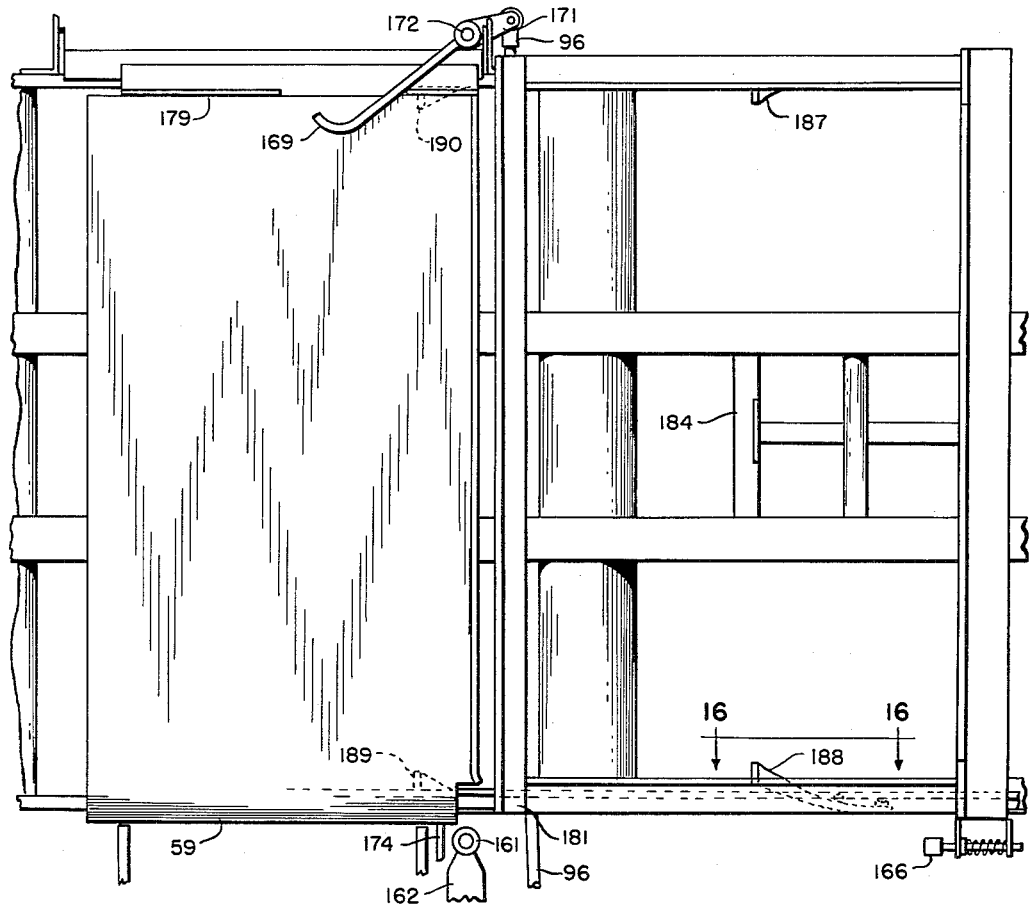
FIG. 14
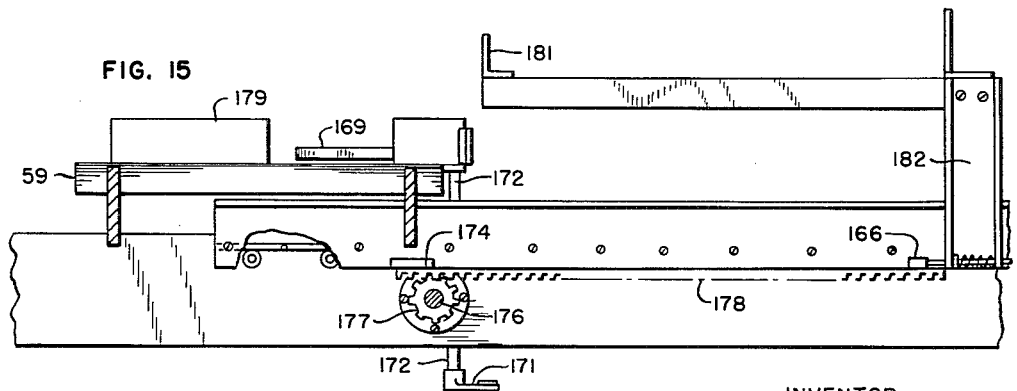
FIG. 15
FIG. 16
INVENTOR
HUGH W. CURRIE
BY
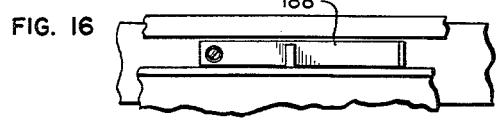
ATTORNEYS

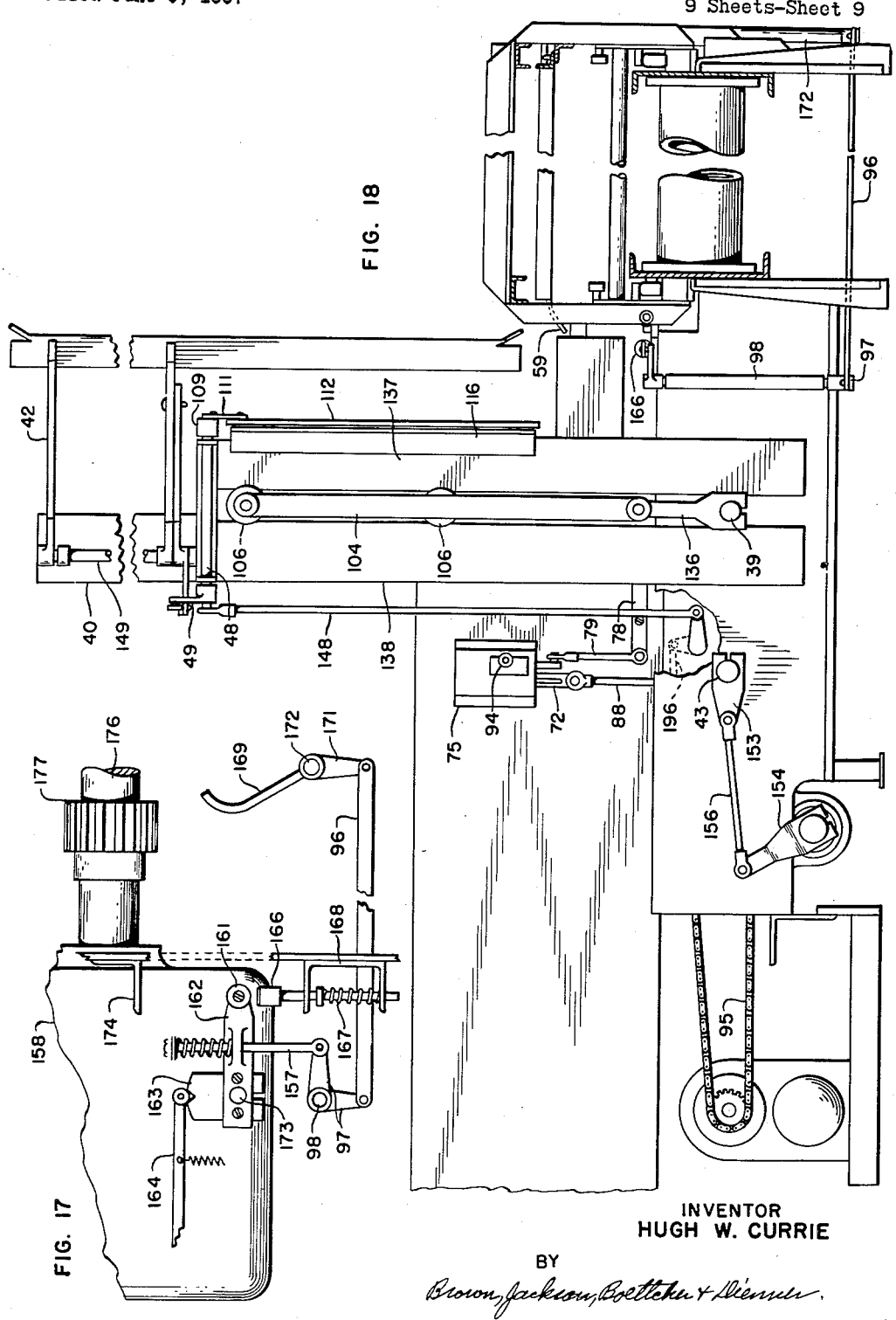

United States Patent Office 2,966,018
Patented Dec. 27, 1960

2,966,018
AUTOMATIC STACKER AND PALLETIZER

Hugh W. Currie, Santa Clara, Calif., assignor to Currie Machinery Company, Santa Clara, Calif., a corporation of Illinois Filed June 5, 1957, Ser. No. 663,746

10 Claims. (Cl. 53—74)

My present invention pertains to the loading of pallets with stacks of cases or boxes, and more particularly, to an automatic machine for receiving crates and assembling them into stacks containing a predetermined number of units, moving the stacks on to a pallet in rows having a predetermined number of stacks therein, and positioning the rows of stacks on the pallet so as to load the pallet with a predetermined number of crates which are positioned on the pallet in a specified manner.

Pallets are used in the industry for a number of crates or boxes for transportation, either within the plant, or for shipment outside the plant. Since the purpose of the use of pallets is to enable the user to move a maximum of crates or boxes, it is important that the crates or boxes be stacked thereon in a uniform manner to facilitate the handling of the pallet and to make the best use of its capacity. The loading of pallets by hand is inconvenient, uneconomical, and unsatisfactory, from the standpoint of uniformity of loading of the pallets. A laborer loading boxes onto a pallet is subject to the human frailties of carelessness and fatigue, and will not ordinarily attain a standard of uniformity which will guarantee the maximum usefulness of the pallet system. It is an object of my invention to provide a machine for assembling boxes or crates into a stack in uniform alignment.

It is a further object of my invention to automatically count the boxes as they are placed in a stack, so as to stack a predetermined number of boxes.

It is also an object of my invention to move the stacked boxes out of a stacking station into a row-forming station, and the rows of stacks on to a pallet.

It is still another object of my invention to control movement both of the rows of stacks and of the pallets, so as to position a stack on the pallet in the most desirable and economical fashion.

These and other objects of my invention will be apparent to one skilled in the art, from a reading of the following description in conjunction with the drawings wherein:

Figure 8 is an elevational view showing the operating linkage for the counting and stripping mechanism;

Figure 9 is a detailed view of the counting box;

Figure 10 is an elevational view showing the interconnection of the counting box with the ejection clutch;

Figure 11 is a detailed side elevation of the counting box;

Figure 14 is a plan view of the stripping plate and the row ejecting mechanism;

Figure 15 is a side elevation of the stripping plate and the row ejecting mechanism;

Figure 16 is a detailed side elevation of the resiliently mounted pallet pusher;

Figure 17 is a detailed view of the transmission control for the drive shaft of the row ejecting mechanism; and Figure 18 is a front elevation of the stacker and palletizer.

Figures 1, 2:
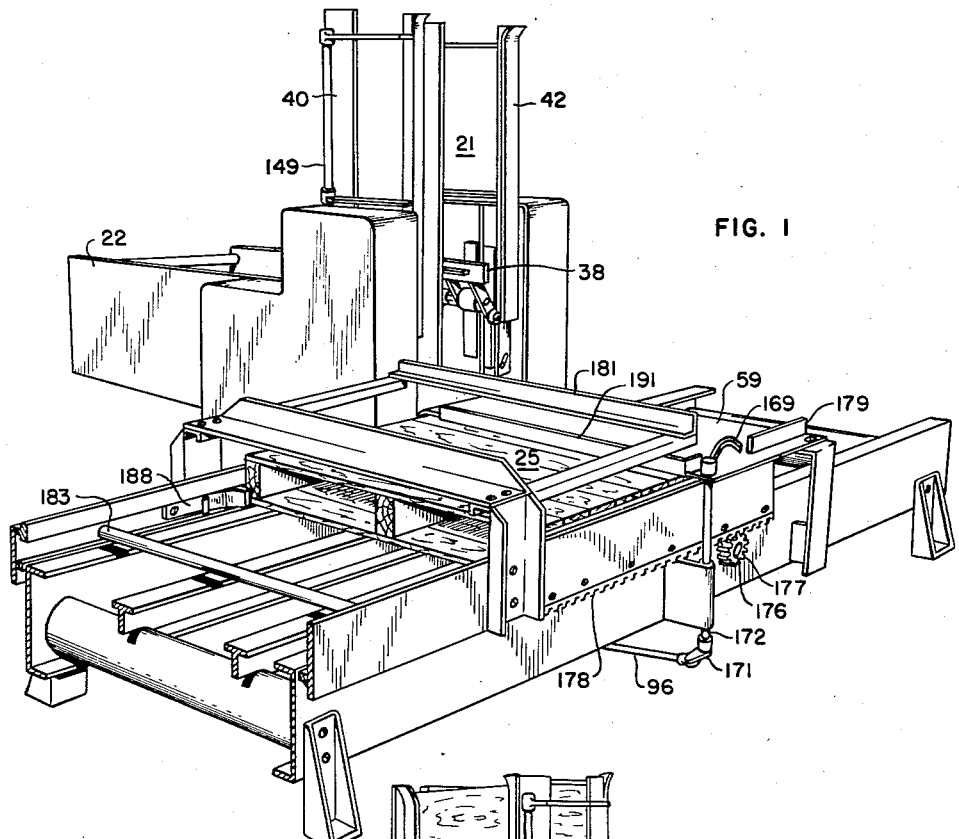
Figure 1 is a front perspective view of the stacking and palletizing machine of my invention.
Figure 2 is a rear perspective view of the stacking and palletizing machine.

Figure 1 is a perspective view of the machine of my invention, showing its overall composition. The crates or boxes are fed into the machine through a chute 22 to a stacking position or station 21, where the boxes or crates are formed into a uniform stack of a predetermined height. After a predetermined number of crates have been formed into a stack at the stacking station 21, a ram automatically moves the formed stack from the stacking station onto a stripper plate 59 and a new stack is then formed at the stacking station 21. The process of completing stacks of crates and moving them from the stacking station onto the stripper plate 59 is continued until a predetermined number of stacks of crates have been moved onto the stripper plate. The presence of a row comprised of a predetermined number of stacks of crates on the stripper plate 59 actuates a ram assembly, generally indicated at 25 in Figure 1, to move a pallet under and beyond the stripper plate to receive the row of stacked crates as they are moved off of the stripper plate by the upper portion of the ram assembly. After moving the completed row of crates off the stripper plate assembly onto the pallet, the ram mechanism returns to its normal position preparatory to moving the subsequent row of crates off of the stripper plate onto the pallet. Since the pallet is moved up by the ram mechanism, the spacing of the rows may be determined by adjustment of the ram mechanism. It will be apparent to one skilled in the art that this selectability of spacing, which can be selectably set, is of great advantage in forming the most economical disposition of the crates or boxes on the pallet.

Included in the major sub-assemblies which have been discussed above are such control means as counter means, actuating means for the case moving ram, return means, and measuring means for determining the amount of advance of the pallet. For the sake of clarity, the individual operation of the sub-assemblies and of their controls will be described individually.

*The stacking mechanism*

Figure 3:
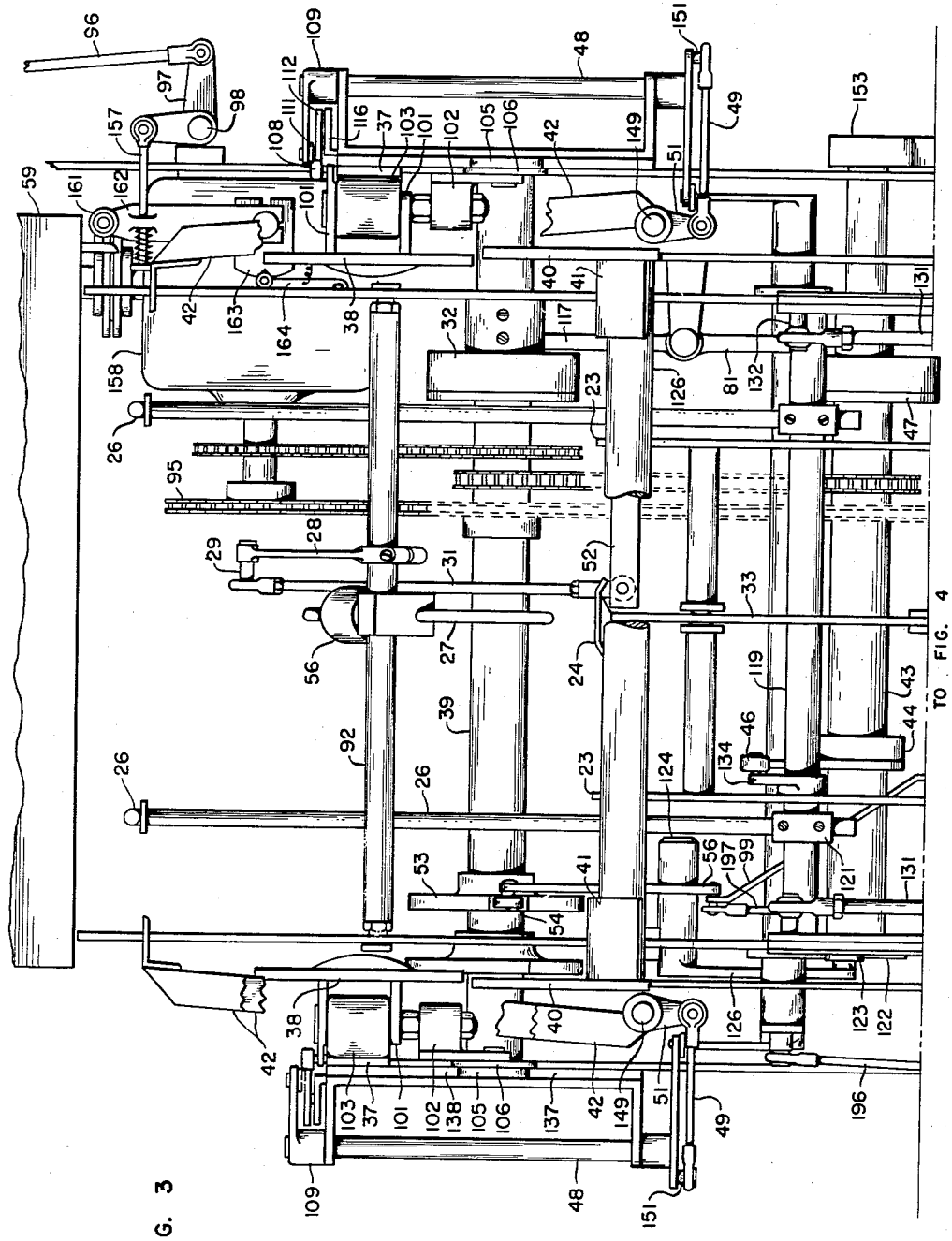
Figure 3 is a partial plan view of the stacker and palletizer.
Figure 4:
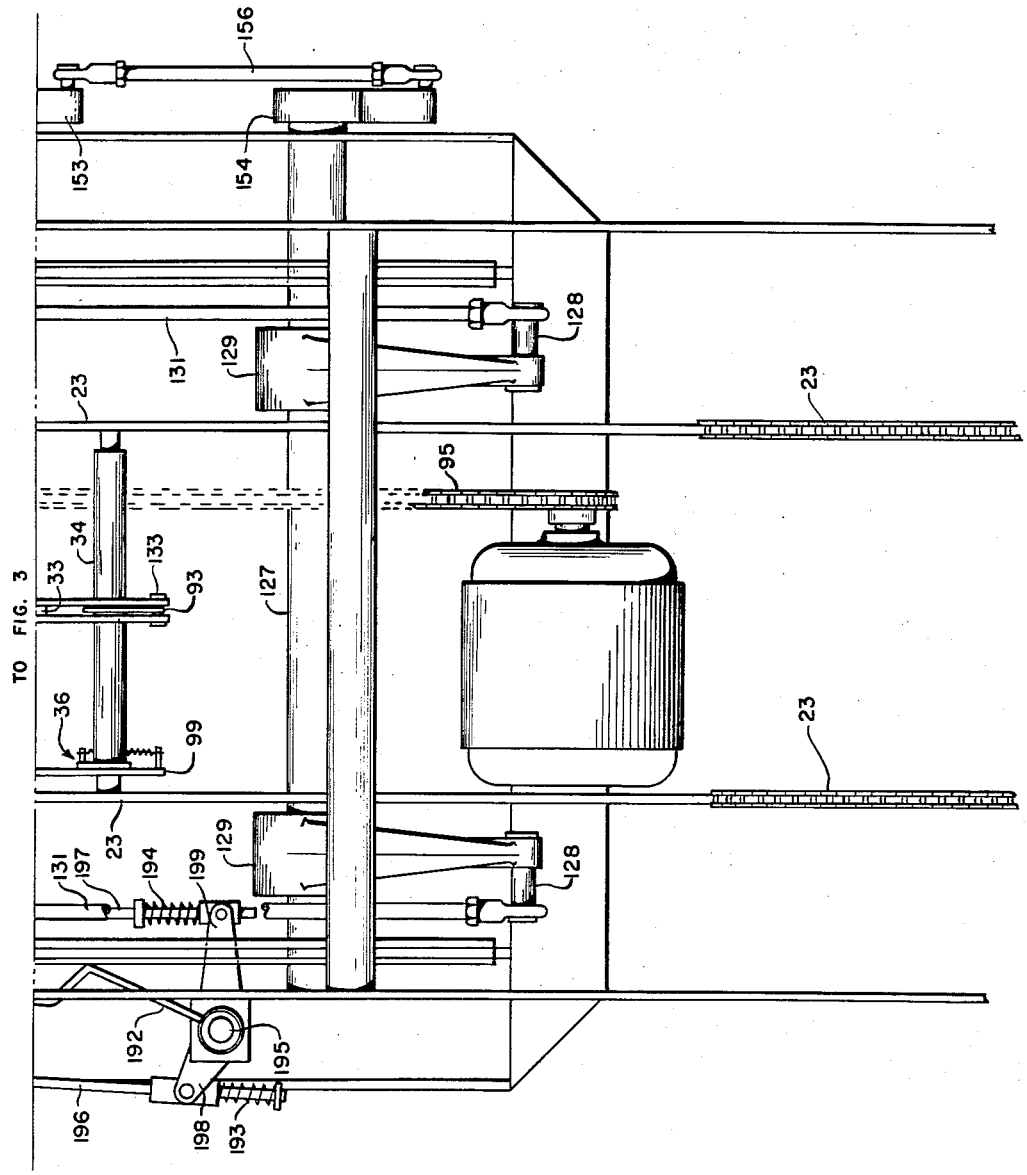
Figure 4 is a partial plan view of the stacker and palletizer, to be taken in conjunction with Figure 3.
Figure 5:
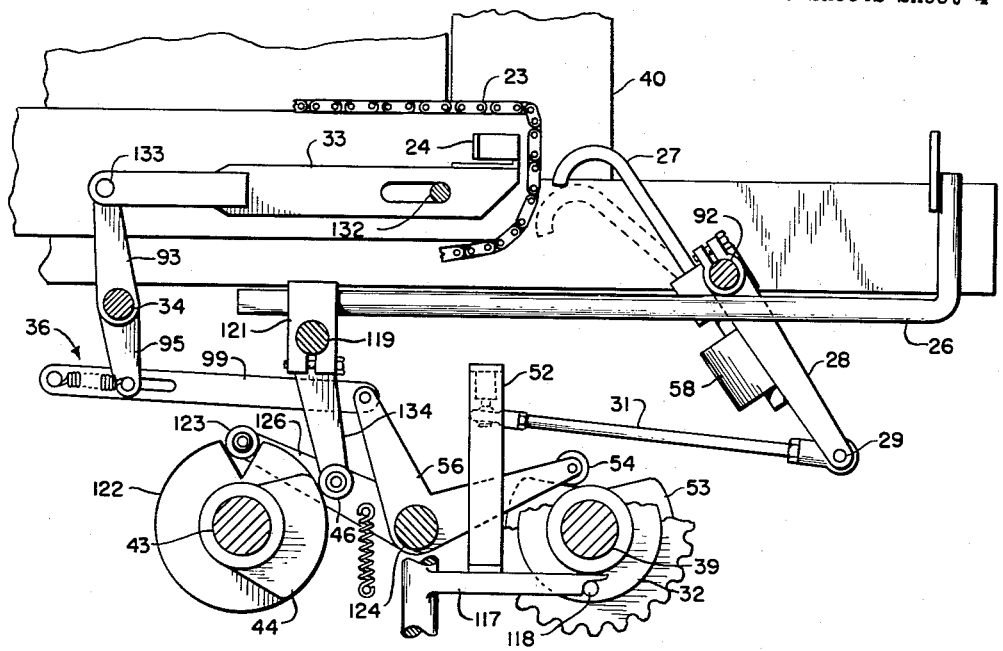
Figure 5 is an elevational view showing in detail the clutch actuating mechanism and the box positioning mechanism.
Figure 6:
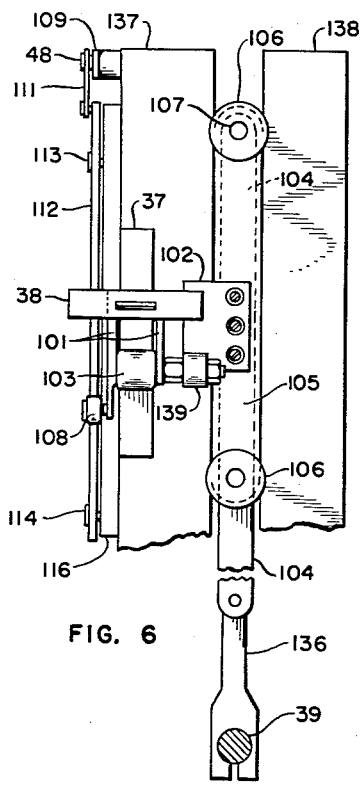
Figure 6 is an elevational view showing the case gripping and elevating mechanism.
Figure 7:
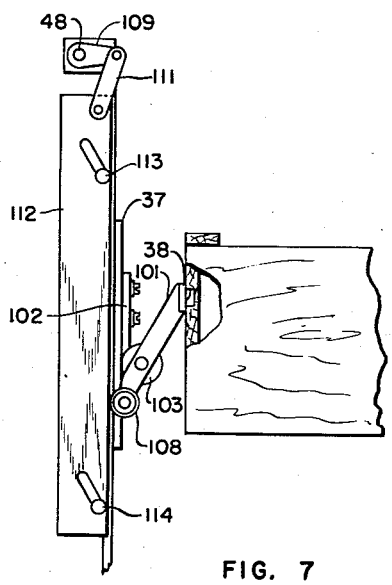
Figure 7 is a side elevational view of Figure 6.

Referring now to Figures 5, 6, and 7, as well as to the overall plan view shown in Figures 3 and 4, the stacking mechanism includes a crate positioning means comprising a pair of feed chains 23 and a positioning ram 24. The positioning ram 24 is suitably secured to a bar 33 which is slidable on a pin 132 in the frame of the machine and is pivoted at 133 to a crank arm 93. The arm 93 is secured on a rockably mounted shaft 34 for movement therewith. A second crank arm 95 is keyed on the shaft 34, so as to rotate the shaft 34 in response to movement of the mechanical linkage made up of an interponent 99 and a bell crank 56. The bell crank 56 has a roller 54 journaled on one end thereof which cooperates with a cam 53 keyed on a rotatable shaft 39 so that the bell crank 56 will be oscillated about its pivot point at 124 due to the configuration of the cam 53 when the shaft 39 is rotated.

The operation of the above described positioning means is work actuated through the activating lever 27 which is pivotally mounted at the pivot point 92 and secured to a bell crank 28. The counterweight 58 is also secured to one end of the activating lever 27 to normally cause the lever 27 to be rotated about the pivot point 92 a predetermined amount in a clockwise direction. An interponent 31 is pivotally connected at one end to the crank arm 28 by a connecting pin 29, and is suitably secured at its other end to an angle bar 52. The bar 52 is so positioned as to rotate the clutch latch 117 away from the clutch locking pin 118 on the clutch 32, so as to allow the clutch 32 to be operated by the shaft 39 in response to the downward, or counter-clockwise, movement of the activating lever 27.

A rod 119 is rotatably journaled in the frame and has a pair of clamps 121 securely fixed thereto. Secured in the clamp 121 is an elongated L-shaped member 26 having its principal axis running substantially perpendicular to the principal axis of the shaft 119. A turning arm 134 (Figure 3) is keyed on the shaft 119 and has in one end thereof, a bearing for the axle of a cam following roller 46, which is in contact with the cam 44 on the shaft 43.

Figures 6 and 7 are detailed elevations of the reciprocating case elevating mechanism. A crank arm 136 is keyed on the shaft 39 as to be rotatable thereby. A reciprocating lever 104 is pivotally pinned to the crank arm 136 at one end and pivotally guided at a pivot point 107 at its opposite end so that rotation of the crank arm 136 imparts up and down reciprocal motion to the pivoted end 107 of the lever 104. The plate 105 is secured at the pivot point 107 so as to be reciprocated up and down between the two guide plates 137 and 138 by the aforementioned reciprocating motion. An anchor plate 102 is suitably secured to the slide plate 105 so as to move therewith. The bracket 102 has a substantially cylindrical bearing plate 139 formed thereon. The bearing bracket 139 has a pin suitably secured therein, which in turn has a pair of support members 101 pivotally mounted thereon with a roller 103 mounted on the pin between the support members 101. The support members 101 have, attached to one end thereof, a crate engaging shoe 38. A roller 108 is suitably attached to and slightly offset from the support members 101 and is engaged with a camming bar 112. The camming bar 112 is secured to a portion of the frame by a pair of pins 113 and 114 which are engaged with diagonally formed camming slots. Also connected to the camming plate 112 is an interponent 111 which is pivotally connected to a bell crank 109 on a pin 48.

In operation of the case pickup mechanism, the shaft 39 is actuated by the clutch 32 being tripped off, as described above, to rotate the crankshaft 136, to thereby impart reciprocal motion to the shoe assembly. At the beginning of the downward motion of the shoe assembly, the shoe is cammed away from the crate by virtue of the inclined plane which forms a cam surface on its lower portion and at the beginning of the upward motion of the assembly, the shoe 38 engages the handhole in the crate, elevating the crate to a predetermined position. Upon the next subsequent case once more tripping off the clutch 32, the shoe assembly moves downward, deposits the first case on top of the subsequent case, is cammed out of engagement, and moves on downwardly until it engages the bottom case, and then commences its upward motion to pick up the bottom case along with the first case stacked.

The counting mechanism

As each crate is added to the stack, it is counted by the counting mechanism shown in Figures 8 and 9, and also Figures 10 and 11. The counting means is comprised of a ratchet bar 72 slidably mounted in a guide frame 75, and having associated therewith a movable ratchet pawl 74 and a holding pawl 73. The operating pawl 74 is mounted on a carrier 76 which is slidably mounted in the frame 75 and is connected to a pivot lever 78 by an interponent 77. The pivot lever 78 is pivotally connected to the main frame at a pivot point 141 and has an interponent 79 pivotally connected to one end thereof, the other end being pivotally connected to the aforementioned interponent 77. The interponent 79 is interconnected with a cam lever 63 which is pivotally connected at a pivot point 64, and has a cam roller 62 at the outer end thereof associated with a cam 61 on the shaft 39. The cam 61 is of such configuration as to oscillate the cam lever 63 upon each revolution of the shaft 39. The oscillating motion of the cam lever 63 is transmitted, through the interponent 79, the pivot lever 78, and the interponent 77, to the ratchet pawl carrier 76 as reciprocating motion, so that for each complete revolution of the cam 39, the pawl 74 is moved down one notch on the ratchet and then moved upwardly thereby moving the ratchet 72 upward. Therefore, for each revolution of the shaft 39, which is one complete box stacking cycle, the ratchet 72 is moved upward one notch, thereby recording the number of box stacking cycles.

Referring now to Figure 10, the ratchet bar 72 has affixed thereto, by a pin 91, an interponent 88 which is slidably connected to a pin block 89 and has a collar 87 securely placed thereon. The pin block 89 has a bell crank 83 pivotally attached thereto. The bell crank 83 is pivotally secured at its elbow to a pin 84 in a bracket 142 and is secured at one end thereof to a clutch latch 82 which is associated with a clutch pin 81 on a clutch 47. The bell crank 83 is so positioned that a predetermined amount of upward movement of the ratchet bar 72 brings the collar 87 into contact with the pin block 89 so as to rotate the bell crank in a clockwise direction (Figure 10). Clockwise rotation of the bell crank 83 moves the clutch latch 82 away from the locking pin 81 on the clutch 47, so as to permit rotation of the shaft 43 and thereby rotation of the cam 67.

A ratchet stripping plate 71 is slidably attached in the ratchet box 75 along with the ratchet bar 72, and is adapted to be reciprocated through the interponent 69 by the cam follower arm 68. The cam roller 66 is rotatably secured to the cam arm 68 and associated with a cam lobe 67. Upon activation of the shaft 43, the cam lobe 67 is rotated to move the cam roller in an upward direction, thereby causing the cam arm 68 to be rotated in a clockwise (Figure 8) direction about its pivot 64 so as to impart reciprocal motion to the stripper plate 71 and to move the plate 71 against the pawls 73 and 74 to rotate them in a clockwise (Figure 9) direction against the urging of their positioning springs thereby to disengage them from the ratchet plate 72, and reset the counting mechanism to zero, preparatory to beginning the subsequent stack.

In order to accommodate a varying number of crates or boxes in a stack, I have provided my counter mechanism with a selecting device, shown most clearly in Figure 11. In the face of the ratchet box 75 are a series of holes for the positioning of a reset block 143. The reset block 143 is positioned on the face of the box 75 by withdrawing the pin 144 from one of the holes and moving the box upward to re-position it with the pin 144 to another of the apertures 148. The reset block 143 has secured therein a positioning pin 146, which is passed through a slot in the face plate of the ratchet box 75 and is positioned in the slot 147 of the ratchet bar 72. By controlling the position of the pin 146 the downward travel of the ratchet bar 72 is also controlled to thereby establish the number of cycles which will be counted prior to the ratchet bar 72 having been moved upward to its upper limit.

The stack ejecting mechanism

When a predetermined number of crates, as determined by the above described counting mechanism, has been placed in the stacking station, the stack ejecting mechanism is actuated. Motivation for the ejecting mechanism is supplied by the shaft 43, hence the activation of the stripping mechanism which is dependent upon the tripping of the clutch latch 81 (Figure 8) causes the cam 44 (Figure 10) to be rotated by the shaft 43 to impart oscillatory motion to the cam follower 46, which is transmitted through the cam follower arm 134 to a shaft 119.

The case stop arms are secured to the shaft 119 by means of clamping blocks 121, so that rotation of the shaft 119 in a clockwise direction (Figure 5) rotates the case positioning arms 26 down and away from the formed stack. A second pair of positioning arms 42 for maintaining lateral alignment of the stacked crates, are similarly rotated out of the way by the actuation of the shaft 43 through the operation of the shaft 119. These two pairs of positioning arms serve to define the stacker station. The arms 42 are pivotally connected to the frame at a pivot point 149, and have a bell crank 51 secured thereto. The bell crank 51 is connected by means of an interponent 49 to a series of mechanical links which are driven by the shaft 119 to actuate the linkage 151 which in turn simultaneously moves the interponent 49 to the right (Figure 3) and rotates the shaft 48 in a clockwise direction. Rotation of the bell crank 51 causes the alignment bars 42 to be rotated away from the stack. Rotation of the shaft 48 moves a camming plate 112, through a linkage comprised of bell crank 109 and interponent 111 downwardly and to the right (Figure 7). This motion is accomplished through the cooperation of the camming pins 113 and 114 with their associated camming slots in the camming plate 112. The roller 108 is positioned on one end of the arm 101 of the case handling hook and is in contact with the edge of the plate 112. As the plate 112 moves to the right, the roller 108 is similarly moved to the right, thereby rotating the arm 101 in a counter-clockwise direction (Figure 7), so as to disengage the crate handling hook 38 from the crates and to hold it out of engaging position during the ejection cycle.

Figure 13:
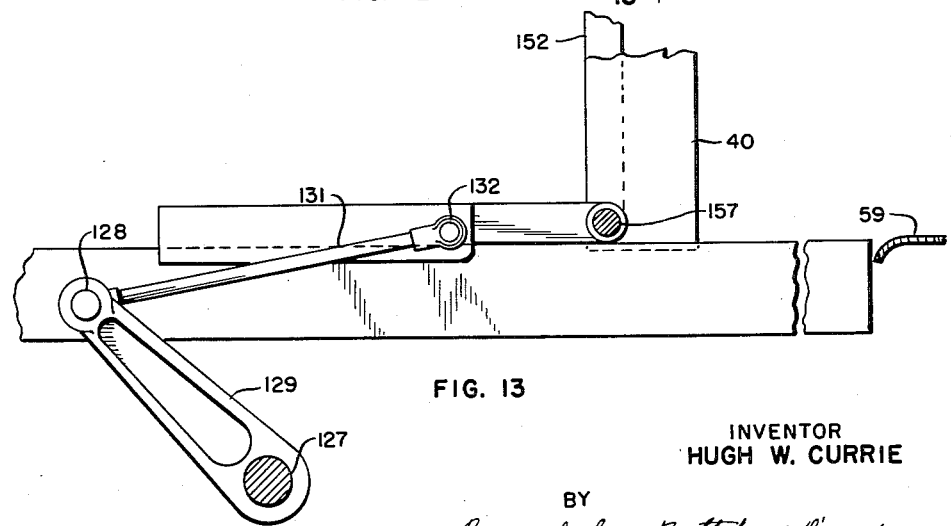
Figure 13 is a detailed elevation of the motivating linkage for the crate ejecting mechanism.

The stack ejecting means 40 is comprised of a pair of rams 41 secured to a rod 126. The rod 126 has a pair of interponents 152 and 153 rigidly affixed to either end thereof. Each of the interponents 152 and 153 has a pin 132 rotatably mounted in the end thereof which is removed from the rod 126. The interponents 152 and 153 are linked to a pair of crank arms 129 through an interponent 131 and the pin 128. The crank arms 129 are keyed to a shaft 127 and are driven by the shaft 43 by means of the throw wheel 153 on the shaft 43 and the throw wheel 154 on the shaft 127 which are interconnected by the interponent 156. As the crank arms 129 are rotated in a clockwise direction (Fig. 13), the interponent 131 moves the ejecting ram 40 to the right. As the rotation of the shaft 127 continues, the assembly is reciprocated by the return of the interponent 131 to its leftward position so as to thereby return the ram 40 to its home position for subsequent operation.

The stripping mechanism

After the stacks have been ejected from the stacking position onto the stripper plate 59, a new stack is formed in the stacking position as heretofore described. Upon the completion of the subsequent stacks, they are similarly ejected onto the stripper plate, moving the prior stack or stacks across the stripper plate ahead of them. After a predetermined number of stacks have been moved onto the stripper plate 59, the lead stack will contact a trip lever 169 and rotate it in a clockwise direction (Figures 14 and 17). The trip lever 169 is keyed to a bell crank 171 by a pivot shaft 172 so that the bell crank 171 turns about the axis of shaft 172 when the trip lever 169 is rotated. Rotation of the bell crank 171 in a clockwise direction rotates a bell crank 97 in a clockwise direction about a pivot 98 through an interponent 96.

A clutch dog 163 is held in a neutral position by a detent 164. When the clutch dog 163 is rotated in a clockwise direction (Figure 17) power is supplied through the transmission 158 (Figure 3) to motivate the row ejecting mechanism in a forward direction. The clutch dog 163 has secured thereto a lever 162 which has a roller 161 on one end thereof. A plunger 157 is associated with the bell crank 97 and with the clutch dog lever 162 so that clockwise rotation of the bell crank 97 moves the plunger 157 in a forward direction, thereby pivoting the lever 162 about a pivot point 173 so as to rotate the clutch dog 163 in a clockwise direction, thereby starting the row ejecting mechanism.

A drive shaft 176 is adapted to be driven by the transmission 158 and has thereon a pair of pinions 175 (Figure 1) and 177 (Figure 17) which are on either side of the framework of the palletizing machine, and have associated therewith a pair of racks 178 (Figures 1, 15, and 17). The racks and pinions driven by the transmission constitute the motivating force for the row ejecting and pallet feed or pusher means. The crate row ram 181 is secured to the racks 178 by means of a pair of brackets 182. The brackets 182 position the ram 181 a predetermined distance above the stripper plate 59 so as to clear the guide rails 191 and 179 to move the row of stacks off of the stripper plate when it is moved forward by the cooperation of the racks and pinions described above. A plurality of pallet movers or pushers are secured to the racks 178 to impart forward movement to the pallet, along with the movement of the racks.

I have shown four pallet pushers, 187, 188, 189, and 190, yieldably mounted along the interior sides of the racks 178. The number of pallet pushers and their position may be varied to vary the amount of movement of the pallet for each successive reciprocating cycle of the racks 178 in the loading of a pallet.

A pallet stop 184 is suitably positioned in the center of the pallet track to hold the pallet against returning when the pinions 178 are reciprocated.

A pallet to be loaded is placed on the pallet track in front of the stop 184 and is positioned between the leading pair of pushers 189 and 190, holding them in an outer and ineffective position, and in front of the following pair of pushers 187 and 188; when racks 178 are fully retracted. On the forward or out stroke of the racks 178, the pushers 187 and 188 contact the pallet and push it outward beneath and beyond the stripper plate 59. At the same time that the pushers 187 and 188 contact the pallet, the ram 181 contacts the row of stacks of crates on stripper plate 59 and pushes them onto the pallet, the latter and the crates moving in the same direction and at the same rate. The length of the out-stroke of the racks 178 is such that the row of stacks of crates placed on the pallet are spaced a short distance outward beyond stripper plate 59 to guard against possible interference with a succeeding row of stacks delivered onto plate 59. When the racks 178 reach the limit of their out-stroke, the drive means therefore is reversed and they are returned to retracted position, as previously explained, the pallet being then held against inward movement by the crates thereon. In the return movement of racks 178 the leading pair of pushers 189 and 190 pass beyond the pallet and move inward to effective position. When the racks 178 are in fully retracted position, the pushers 189 and 190 are spaced inward from the pallet a distance corresponding to the spacing from the stripper plate 59 of the row of stacks of crates on the pallet, the pairs of pushers being appropriately spaced to that end, as will be understood. On the succeeding out-stroke of racks 178, the ram 181 contacts the row of stacks of crates on stripper plate 59 in advance of contact of the pushers 189 and 190 with the pallet. The ram 181 pushes the row of stacks of crates from stripper plate 59 into contact with the row of stacks of crates on the pallet, at which time the pushers 189 and 190 contact the pallet and push it outward beyond stripper plate 59 at the same rate as the ram 181 pushes the row of stacks of crates from plate 59 onto the pallet. In that manner any space or gap between the two rows of stacks of crates loaded onto the pallet is avoided. That is advantageous in assuring a firm load of crates on the pallet while also permitting the use of shorter pallets than would be required if the rows of stacks on the pallet were spaced apart. After one pallet has been loaded as above explained, succeeding pallets are loaded in the same manner.

While the first row is ejected onto the pallet, the pallet is moved by the pallet movers 187 and 188 at the same rate and for the same distance as the row is moved by the case ram 181. After the racks 178 have completed their forward cycle, the plunger 166 is compressed by the roller 161 until sufficient energy is stored in the plunger spring 167 to rotate the lever 162 about its pivot 173, thereby moving the clutch dog 163 into the reverse position and reversing the rotation of the shaft 176 and the pinions 177 and 175 thereon, to return the case ram and the pallet movers to their original position. Upon the ram assembly reaching its starting position, the bracket 174 (Figure 17) contacts the roller 161 to rotate the lever 162 a predetermined distance and return the clutch dogs 163 to its neutral position until a full complement of stacks of crates, which will make up a row, have been moved on to the stripper plate 59 to rotate the lever 69.

Overall operation

The crates to be palletized are fed into the machine through a trough 22 (Figure 1) to the stacking station 21 by the feed chains 23. Placing the crate in the stacking position rotates the trip lever 27, thereby activating the one-revolution clutch 32 through a linkage comprised of the elements 28, 29, 31, and 52, which are motivated by the rotation of the shaft 92 by the motion of the trip lever 27. The tripping of the clutch 32 rotates the shaft 39 to actuate a case positioning ram 24 through the bell crank 56, cam follower 54, cam 53, and a linking means comprised of the elements 99, 95, 93, and 33, to positively position the crate against the case stop arm 26. Rotation of the shaft 39 also imparts rotary motion to a crank 136 which in turn imparts reciprocal motion to a slide plate 104 to operate the case gripping assembly. It is, of course, understood that there are two crate gripping assemblies, one on either side of the stacking position, operated from the shaft 39, although only one is shown in Figure 6.

As the crate gripping assembly is moved downward, the shoe carrying lever 101 is cammed away from the case by virtue of its configuration in cooperation with the case. Upward movement of the slide bar 104 moves the crate gripping assembly upward and the crate gripping shoe is engaged with either the bottom of the crate or the handhole (Figure 7), to lift the cases to the uppermost position. When a subsequent crate is deposited in the stacking position, as described above, the crate gripping assembly is moved downward and the first crate deposited on top of the subsequent crate, at which point the crate gripping foot 38 is cammed out of the first crate and passes on downwardly subsequently to lift both crates upon completion of the reciprocating cycle.

After a predetermined number of crates have been similarly stacked on top of one another, the stack ejecting mechanism is actuated. Each crate to be placed on the stack is recorded through a counting mechanism motivated by a counting cam on the shaft 39. Each revolution of the shaft 39 is recorded on a counting ratchet 72 (Figures 8, 9, and 11), operating through a counting means consisting of the members 79, 78, 77, 76, and 74, which cooperate to move the counting ratchet 72 one notch for each revolution of the shaft 39, to be held there by a holding pawl 73 (Figure 9).

A tripping collar 87 (Figure 10) is moved upwardly a predetermined amount for each movement of the ratchet 72. After a predetermined number of cycles, the collar 87 engages a tripping means comprised of the members 89, 83, and 82 to engage the clutch 47 to thereby permit rotation of the shafe 43. Rotation of the shaft 43 actuates a counter-cancelling device which is comprised of a cam 67, a cam roller 66, an interponent 69, and a cancelling bar 71. Operation of the shaft 43 moves the crate holding bars 26 to an ineffective position by means of a cam 44, cam follower 46, shaft 119, and a collar 121. Operation of the shaft 43 actuates a disabling means 48 through the linkage comprised of the members 151 and 49.

The case gripping assembly disengaging means is adapted to be operated by the shaft 48 through the levers 109 and 111 which impart angular motion to a cam bar 112 to rotate the case gripping arm 101 out of engaging position. Actuation of the shaft 48 similarly disengages the positioning arms 42 so as to permit ejection of the completed stack on to the stripper plate 59.

Figure 12:
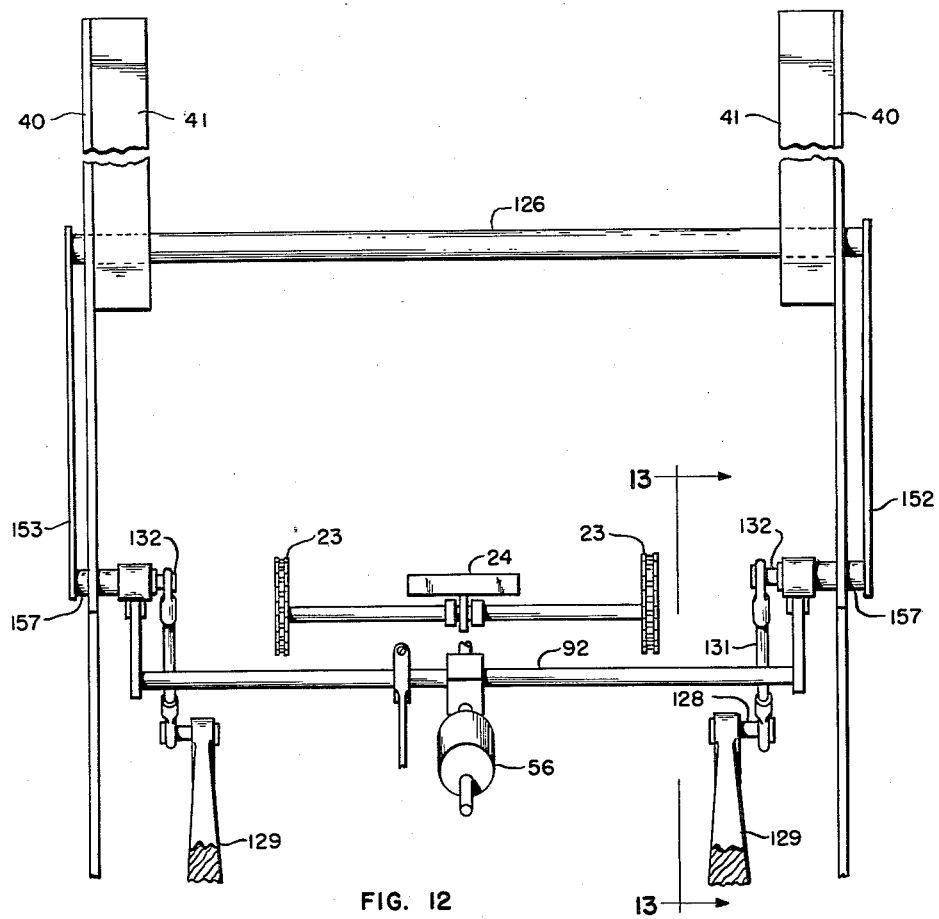
Figure 12 is a plan view of the crate ejecting mechanism.

The stack ejecting ram 40 (Figures 12 and 13) is operated by the interponents 152 and 153 which are motivated from a shaft 127 through a linkage comprised of the member 129, 131, and 132. The power for the shaft 127 is originated from the shaft 43 and transmitted through a throw wheel 153 and interponent 156 and a throw wheel 154.

After a predetermined number of stacks has been ejected onto the stripper plate, the first stack contacts a trip lever 169 to actuate the row ejection mechanism. The row ejection mechanism is actuated through a transmission 158 by an actuating means comprised of a bell crank 171 and interponent 96, a bell crank 97, a plunger 157, and a lever 162 which rotate a clutch dog 163 to engage the transmission to propel a drive shaft 176 in a forward direction. The drive shaft imparts lineal movement to a pair of racks 178, through a pair of pinions 175 and 177 keyed to the shaft 176. The case row ram 181 is secured to the racks 178 in a position to eject the row of cases off of the stripper plate, as a result of the forward motion of the racks 178. The pallet moving device is adapted to move the pallet underneath the stripper plate at the same rate as the row of cases is ejected from the stripper plate. A pallet moving means is comprised of a plurality of resiliently mounted pallet pushers 187, 188, 190, 189 which are secured to a portion of the rack 178 to be moved thereby. The positioning of the pallet pushers along the rack 178 determines the amount of the forward motion to be imparted to the pallet by the forward motion of the rack 178. Due to the placing of the pallet pushers, the subsequent row to be ejected from the stripper plate by the ram 181 is moved prior to the subsequent movement of the pallet so as to do away with the gap which would otherwise occur between the rows of stacks of crates.

An additional feature of my invention is a lockout bar 192 (Figures 3 and 4) which serves the dual function of preventing more than one crate entering the stacking position at one time, and of preventing a crate from entering the stacking position during the ejection cycle.

The lockout bar 192 is rigidly mounted on a rotatable shaft 195. The shaft 195 has keyed thereto a pair of bell cranks 198 and 199. The bell cranks 198 and 199 are so secured to the shaft 195 that rotation thereof will impart rotation to the shaft 195 and thereby movement to the lockout bar 192.

The bell crank 199 is adapted to be rotated clockwise in response to the rotation of the case positioning and lifting shaft 39 through the operation of the bell crank 56 and the connector 197, which is connected through the crank arm 199 to a spring 194. Rearward movement of the connector 197 in response to the movement of the bell crank 56 will compress the spring 194, thereby imparting rotary motion to the shaft 195 through the crank arm 191 to position the crate lockout bar 192 in the path of the incoming crates to negate the possibility of two cases coming into the stacking position at one time.

The second function of the lockout bar is to prevent the entrance of crates into the stacking position during the ejection cycle. Accordingly, the second mode of operation of the lockout bar is motivated by the actuation of the crate ejecting shaft 43 and the shaft 119 which is operated by the shaft 43 through the operation of the roller 46 and the roller arm 134. Rotation of the shaft 119 imparts forward motion to the connector 196 to compress a spring 193 to thereby impart clockwise rotary movement to the shaft 195 through the crank arm 198, so as to position the lockout bar 192 in the path of the incoming crates during the ejection cycle.

It will be understood that changes in detail may be made in the above described device without departing from the field and scope of my invention, and that I intend to include all such variations as fall within the scope of the appended claims in this application in which only the preferred form of my invention has been disclosed.

I claim:

1. In a machine for stacking and palletizing crates, a substantially rectangular horizontal support, stack controlled means for forming a stack of crates and automatically positioning the stack on the upper face of said support, and stack actuated means for automatically moving a pallet beneath said support in close proximity to the under face thereof at a predetermined rate toward and beyond one edge of said support and for simultaneously moving said stack across said support at said predetermined rate toward and beyond said one edge thereof and thereby sliding said stack onto said pallet while the latter and said stack are moving in the same direction at the same rate.

2. In a machine for stacking and palletizing crates, a substantially rectangular stationary flat stripper plate, stack controlled means for forming a stack of crates and automatically positioning the stack on the upper face of said plate, and stack actuated means for automatically moving a pallet beneath said plate in close proximity to the under face thereof at a predetermined rate toward and beyond one edge of said plate and for simultaneously moving said stack across said plate at said predetermined rate toward and beyond said one edge thereof and thereby moving said stack from said plate onto said pallet while the latter and said stack are moving in the same direction at the same rate.

3. In a machine for stacking and palletizing crates, a substantially rectangular stationary flat stripper plate, stack controlled means for forming a plurality of stacks of crates and automatically and successively positioning them on the upper face of said plate in adjacent relation substantially parallel with one edge thereof, and means actuated by the leading stack on said plate for automatically moving a pallet beneath said plate in close proximity to the under face of said plate at a predetermined rate toward and beyond said one edge of said plate and for moving all of said stacks across said plate toward and beyond said one edge thereof at said predetermined rate and thereby sliding said stacks from said plate onto said pallet while the latter and said stacks are moving in the same direction at the same rate.

4. In a machine for stacking and palletizing crates, a substantially rectangular stationary flat stripper plate, stack controlled means for forming a stack of crates and automatically positioning the stack on the upper face of said plate, means extending beneath said plate for slidably supporting a pallet with its upper face in a plane in close proximity to the under face of said plate, and stack actuated means for automatically moving the pallet along said supporting means at a predetermined rate beneath said plate and toward and beyond one edge thereof and for simultaneously moving said stack across said plate at said predetermined rate toward and beyond said one edge thereof and thereby moving said stack from said plate onto said pallet while the latter and said stack are moving in the same direction at the same rate.

5. In a machine for stacking and pelletizing crates, a substantially rectangular stationary flat stripper plate, stack controlled means for forming a stack of crates and automatically positioning the stack on the upper face of said plate, means extending beneath said plate for slidably supporting a pallet with its upper face in a plane in close proximity to the under face of said plate, and stack controlled means for automatically moving the pallet along said supporting means at a predetermined rate and through a predetermined distance beneath said plate and toward and beyond one edge thereof and for simultaneously moving said stack across said plate at said predetermined rate and through said predetermined distance toward and beyond said one edge of said plate and thereby sliding said stack onto said pallet while the latter and said stack are moving in the same direction at the same rate.

6. In a machine for stacking and palletizing crates, a substantially rectangular stationary flat stripper plate, means for forming a stack of crates and positioning the stack on the upper face of said plate, means extending beneath said plate for slidably supporting a pallet with its upper face in a plane in close proximity to the under face of said plate, pallet pusher means movable toward and away from said plate disposed to move a pallet on said supporting means beneath said plate and toward and beyond one edge thereof, a ram fixedly secured on said pusher means disposed to contact said stack and slide it toward and beyond said one edge of said plate onto the pallet in the movement of the latter beyond said one edge of said plate, and means for moving said pallet pusher means and with it said ram toward and beyond said one edge of said plate and thereby sliding said stack off of said plate onto the pallet while the latter and said stack are moving in the same direction at the same rate.

7. In a machine for stacking and palletizing crates, a substantially rectangular stationary flat stripper plate, stack controlled means for forming a plurality of stacks of crates and automatically positioning them on the upper face of said plate in adjacent relation substantially parallel with one edge thereof, means extending beneath said plate for slidably supporting a pallet with its upper face in a plane in close proximity to the under face of said plate, pallet pusher means movable toward and away from said plate disposed to move a pallet on said supporting means beneath said plate and toward and beyond said one edge thereof, a ram fixedly secured on said pusher means disposed to contact and slide all of said stacks on said plate toward and beyond said one edge of said plate, and stack actuated means for automatically moving said pallet pusher means and with it said ram toward and beyond said one edge of said plate and thereby sliding said stacks off of said plate onto the pallet while the latter and said stacks are moving in the same direction at the same speed.

8. In a machine for stacking and palletizing crates, a stacking station, means for forming at said station a stack of a predetermined number of crates, a stripper plate adjacent said station, means actuated responsive to completion of the stack for automatically moving said stack from said station onto said plate, and stack actuated means for automatically moving a pallet beneath said plate in proximity thereto at a predetermined rate toward and beyond one edge thereof and simultaneously moving said stack across said plate at said predetermined rate toward and beyond said one edge thereof and thereby sliding said stack as a unit onto said pallet while the latter and said stack are moving in the same direction and at the same rate.

9. In a machine for stacking and palletizing crates, a stripper plate, means for forming rows of stacks of crates and successively positioning said rows on the upper face of said plate, means for slidably supporting a pallet with its upper face in proximity to the underface of said plate, pallet pusher means movable toward and away from said plate and disposed to move a pallet on said supporting means beneath said plate toward and beyond one edge thereof in the movement of said pusher means toward said plate, a ram on said pusher means disposed to contact a row of stacks on said plate and slide it toward and beyond said plate onto the pallet in the movement of the latter beyond said one edge of said plate, and means for moving said pallet pusher means and with it said ram toward and beyond said one edge of said plate, said pallet pusher means comprising supplementary means effective in cooperation with said ram for sliding a first row of stacks off of said plate onto the pallet while the latter and said first row of stacks are moving in the same direction at the same rate and thereafter sliding a second row of stacks over said plate into contact with said first row while said pallet remains stationary and then sliding said second row off of said plate onto said pallet while moving the latter and said second row in the same direction at the same rate.

10. In a machine for stacking and palletizing crates, a stripper plate, means for forming rows of stacks of crates and successively positioning said rows on the upper face of said plate, means for slidably supporting a pallet with its upper face in proximity to the underface of said plate, pallet pusher means movable toward and away from said plate and disposed to move a pallet on said supporting means beneath said plate toward and beyond one edge thereof in the movement of said pusher means toward said plate, a ram on said pusher means disposed to contact a row of stacks on said plate and slide it toward and beyond said plate onto the pallet in the movement of the latter beyond said one edge of said plate, and means for moving said pallet pusher means and with it said ram toward and beyond said one edge of said plate, said pallet pusher means comprising spaced pusher members disposed and adapted in cooperation with said ram for sliding a first row of stacks off of said plate onto the pallet while the latter and said first row of stacks are moving in the same direction at the same rate and thereafter sliding a second row of stacks over said plate into contact with said first row while said pallet remains stationary and then sliding said second row off of said plate onto said pallet while moving the latter and said second row in the same direction at the same rate.

References Cited in the file of this patent

UNITED STATES PATENTS

| | | |
|---|---|---|
| 548,056 | Hewitt | Oct. 15, 1895 |
| 1,490,594 | De Lateur | Apr. 15, 1924 |
| 2,028,410 | Rapisarda | Jan. 21, 1936 |
| 2,550,587 | Neja | Apr. 24, 1951 |
| 2,633,251 | Bruce | Mar. 31, 1953 |
| 2,746,662 | Thompson et al. | May 22, 1956 |
| 2,780,340 | Hynson | Feb. 5, 1957 |

FOREIGN PATENTS

| | | |
|---|---|---|
| 152,260 | Australia | July 9, 1953 |